12,669,689
Patented June 13, 1972

3,669,689
FORTIFICATION OF FOOD OR ALCOHOLIC BEVERAGES WITH COPOLYPEPTIDES
Kazuo Hoshino, Tokyo, and Akio Kanemitsu, Machida-shi, Japan, assignors to Kyowa Hakko Kogyo Co., Ltd., Tokyo, Japan
No Drawing. Continuation-in-part of application Ser. No. 765,986, Oct. 8, 1968, which is a continuation-in-part of application Ser. No. 384,517, July 22, 1964. This application Aug. 14, 1970, Ser. No. 63,918
Claims priority, application Japan, June 30, 1963, 38/37,803; Aug. 22, 1963, 38/43,773
Int. Cl. A23l 1/26
U.S. Cl. 99—140 R                 16 Claims

ABSTRACT OF THE DISCLOSURE

A food product or alcoholic beverage flavor fortified with ornithine-aspartate copolypeptide or ornithine-aspartic acid copolypeptide. The additive is especially beneficial with food deficient in amino acids, such as rice.

---

This application is a continuation-in-part of copending application Ser. No. 765,986, filed Oct. 8, 1968, now abandoned which is in turn a continuation-in-part application of application Ser. No. 384,517, filed on July 22, 1964, now abandoned.

BACKGROUND OF THE INVENTION

The present invention relates to foods, including alcoholic beverages, flavor fortified by the addition thereto of copolypeptides, e.g. a salt or peptide of ornithine-aspartic acid. More specifically, the present invention relates to a composition of matter for fortifying rice, comprising copolypeptides of amino acids.

Such alimentary materials as brewed products (fermentation products), seasonings, dairy products, cereals, candies, paste made from the starch of devil's tongue (the prickly pear *Opuntia compressa*), bean-curds, etc. and the various kinds of fodder (food for domestic animals) generally leave much to be desired from the standpoint of amino acid content. Rice not only lacks amino acids but also lacks protein.

Nitrogen compounds such as the salts or peptides of amino acids are known in the prior art for effecting characteristic flavor in alcoholic beverages such as sake, synthetic sake, beer, sparkling liquor, fruit wine, liqueur, raochu, shochu or the like. However, the kind or amount of these effective ingredients for alcoholic beverages are, in general, not satisfactory. For example, sake contains a constitutional amino acid which affords a characteristic taste but which is harmful to flavor. In beer and sparkling liquor, for example, the ratio of constitutional protein and enzyme such as protease, peptidase or the like is not favorable to their preparation because of the kind of raw material barley employed. Thus, because of the barley the necessary amount of nitrogen compound is not obtained. Low protein beer barley is considered to be the best raw material to be used in relatively small amounts and when this is used the protein constitution and enzyme function lose their proper balance, whereby beverages having a low peptide content and insufficient flavor are produced.

A primary object of the present invention is to improve the quality of foods and drinks of the above-enumerated types by the incorporation therein of an additive which enhances the flavor of the treated products. Thus, improved food and drink of enhanced flavor and thus of superior commercial value are produced.

According to the present invention, the aforesaid object of the invention is realized by incorporating a small quantity of a copolypeptide, e.g. a salt or peptide or ornithine-aspartic acid into alimentary products, especially brewed materials such as grape-wine vinegar, apple-wine vinegar, malt vinegar, rice vinegar, sake-cake vinegar, alcohol vinegar, synthetic vinegar, mayonnaise, French dressing, sauces, soy sauce, seasoning-containing liquids, miso (including the dried material) or the like, seasonings per se, dairy products such as cheese, yoghurt, milk or the like, cereals such as wheat flour, bread crumbs, soybean flour, rice flour, barley fluor or the like, confections such as chewing gum, carmel candies, chocolate or the like, food products such as a paste made from the starch of devil's tongue, bean-curd or the like, and fodder, or into alcoholic beverages, for example, sake, synthetic sake, fruit wine (such as grape wine, apple wine or the like) liqueur such as plum wine, spicy wine, raochu, shochu, beer or sparkling liquor. In the case of rice, the aforementioned salt or peptide is conveniently added at the time of cooking the rice, together with conventional seasonings such as sodium glutamate, table salt and the like.

The aforeenumerated alimentary products are generally deficient in constituent amino acids, such as ornithine, aspartic acid and the like. However, these amino acids are important. Thus ornithine, which is to be found in animal livers, performs, among other things, the important function of producing the indispensable amino acid, arginine. However, it cannot be found in the proteins of living bodies, except in livers. In this regard, the addition of the special agent according to the invention has a special significance. Aspartic acid not only takes part in ammonia neutralization together with ornithine, but is also considered to produce malic acid and to participate in the Krebs cycle.

The content of ornithine and aspartic acid in natural food is extremely low, except in the case of animal blood and in liver. It is therefore desirable to enrich food with ornithine and/or aspartic acid, but the individual incorporation of these additament amino acids prejudices the taste of the food in which they are incorporated. This defect is obviated by the incorporation of these desirable amino acids into alimentary products in accordance with the present invention in combined form as an ornithine-aspartic acid salt or as a peptide of ornithine-aspartic acid. Not only does the taste of the food remain unimpaired but, on the contrary, the flavor thereof is enhanced.

As indicated above, ornithine functions as a protein-constituting amino acid when it is absorbed in a living body. This function is considered to be doubled when ornithine is used together with aspartic acid. However, ornithine has a strong alkalinity and when exposed to the air in the uncombined form it absorbs carbon dioxide and is turned into an inactivated state. Hence, it has been used in the form of the hydrochloric acid salt when used as an additive in an alcoholic beverage. However, when the hydrochloric acid salt is added to an alcoholic beverage such as sake or the like, the constituent hydrochloric acid is liberated and the pH of the alcoholic beverage is lowered. The liberated hydrochloric acid, in cooperation with sodium ion previously existing in the sake or the like alcoholic beverage increases the salty taste excessively, and the taste of the sake or the like is spoiled. Accordingly, when ornithine is added in the form of a salt or peptide of ornithine-aspartic acid, in accordance with this invention, there is no deterioration of the taste, for example, the liberation of hydrochloric acid. On the contrary, the sake or the like is enhanced with a good taste and plenty of body, a result that could not be expected or predicted.

Recently, there has been a general recognition of the use of salts or peptides of amino acids in alcoholic beverages, especially in sake. Although these nitrogen-containing compounds are known to furnish a special flavor to sake or the like, the nature of the constituent amino acid is a subject requiring special consideration. In other words, some of the additive amino acids have a harmful effect on the flavor even though they have the characteristic taste. They must at the same time maintain a good balance with the amino acid composition in the alcoholic beverages. For example, a compound such as ornithine-glutamic acid salt decomposes and liberates glutamic acid, which is not desirable because of its acidic taste.

As for the biological effect of ornithine-aspartic acid, which may also be termed ornithine aspartate, it was recently found that it has a remarkable effect on rats. When it is used in the form of an additive to sake, the absorption of constituent amino acid is doubled. However, when this material is used together with another sake-fortifying method, it is harmless. For example, it can be safely used together with customary seasonings for preparing synthetic sake. It affords good harmony and good body.

The addition of ornithine-aspartic acid salt or its peptide to beer or sparkling liquor exerts a wonderful effort upon the maintenance of flavor when the beer or sparkling liquor has been made using an insufficient amount of low protein beer barley. This low protein beer barley is not satisfactory because the protein constitution and the enzyme function are out of balance, and the flavor is inferior. As a result of the stimulating effect of carbon dioxide contained in these alcoholic beverages upon the inner wall of the stomach, the absorption of ornithine-aspartic acid is enhanced.

Rice is a food which is lacking in nitrogen constituents. Continued eating of rice sometimes results in dietary unbalance. The addition of the additive agent according to the present invention raises the nutritive value of rice. Simple mixing with polished white rice is not suitable because the additive may be washed out during the washing of the rice. It is therefore preferred to convert the additive agent into the form of a power or tablet or granules, if desired in admixture with other substances, and to add the thus-converted material to the rice in the course of the cooking of the latter.

The other substances which may be admixed with the new additive of the invention can vary widely. The other substances are selected primarly from the standpoint of convenience in use, reasonable price and absence of harm to the flavor of the cooked rice. A preferred composition according to the present invention for this purpose comprises a mixture of table salt, sodium glutamate and a salt or peptide of ornithine-aspartic acid, together with a binder such as starch, milk, sugar or crystalline cellulose. This mixture may be shaped, for example, into tablet form in order to produce a suitable commercial product. As for the amounts of these ingredients to be used as an additive for fortifying rice, about 0.1 to 1.5% by weight of salt, based on the weight of the rice, can be utilized. From about 10 to 30% by weight of the salt or peptide of ornithine-aspartic acid relative to the amount of table salt is preferred. The amounts of sodium glutamate, starch, milk sugar and/or crystalline cellulose are minor and optional.

The additives in the preparation of fortified rice, such as sodium glutamate, table salt, starch, etc., are used to improve the taste of cooked rice, to promote appetite and to aid in improving the absorption of the salt or peptide of ornithine-aspartic acid. The amount of the shaped product such as tablets, granules or the like with respect to the cooked rice varies according to the content of the salt or peptide or ornithine-aspartic acid in the shaped product, but from about 0.01 to 0.5% by weight of the salt or peptide of ornithine-aspartic acid based on the amount of rice is suitable. It is possible to increase or decrease the amount as desired. The 0.01 to 0.5% range is also preferred when adding the fortifying agent of the invention to any of the other alimentary products.

Only a small amount of the additive salt or peptide of ornithine-aspartic acid needs to be added to an alcoholic beverage in order to fortify it in accordance with this invention. About 0.1 to 1.0% by weight of additive, based on the weight of alcoholic beverage, is preferred.

The following examples are given merely as illustrative of the present invention and are not to be considered as limiting.

EXAMPLE 1

25 grams of ornithine-aspartic acid salt or 23 grams of ornithine-aspartic acid peptide were added to 10 liters of grape-wine vinegar which had been taken out of a brewing vessel or tower and purified by filtration or distillation. An organoleptic panel test consisting of 10 taste testers was given in order to compare the taste of the thus prepared grape-wine vinegar with that of a grape-wine vinegar without the addition of ornithine-aspartic acid salt or ornithine-aspartic acid peptide. The results are shown in the table below.

TABLE 1

| Vinegar | Tester— | | | | | | | | | | Total |
|---|---|---|---|---|---|---|---|---|---|---|---|
| | 1 | 2 | 3 | 4 | 5 | 6 | 7 | 8 | 9 | 10 | |
| Grape-wine vinegar only | X | X | X | X | X | X | X | X | O | X | 1 |
| Grape-wine vinegar containing ornithine-aspartic acid | O | O | O | O | O | O | O | O | X | O | 9 |

NOTE:
X = Not agreeable.
O = Agreeable.

The present grape-wine vinegar was superior to a grape-wine vinegar without the addition of ornithine-aspartic acid salt or ornithine-aspartic acid peptide at the 5% level of significance.

Conclusion: By adding ornithine-aspartic acid or ornithine-aspartic acid peptide to a grape-wine vinegar, said vinegar became so rich in natural feelings that the roundness (body) peculiar to a grape-wine vinegar could be given.

EXAMPLE 2

To 10 liters of rice vinegar which was filtered after maturing, 27 grams of ornithine-aspartic acid salt or 25 grams of ornithine-aspartic acid peptide are added. An improved vinegar is obtained.

EXAMPLE 3

After sugars and colorants are dissolved in synthetic vinegar prepared by diluting acetic acid with water, 39 grams or ornithine-aspartic acid salt or 36 grams of ornithine-aspartic acid peptide are added per 10 liters of synthetic vinegar.

EXAMPLE 4

In conventionally manufacturing mayonnaise, at the end of the processing, i.e., at the period of stirring, 30 grams of ornithine aspartic acid salt or 28 grams of ornithine-aspartic acid peptide were added to 10 liters of mayonnaise to yield a fortified product. An organoleptic panel test consisting of 15 taste testers was given in order to compare the taste of the thus prepared product with that of a mayonnaise without the addition of the ornithine-aspartic acid salt or ornithine-aspartic acid peptide. The results are shown in the table below.

TABLE 2

| Mayonnaise | Tester | | | | | | | | | | | | | | | Total |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | |
| Mayonnaise only | X | X | X | X | X | O | X | X | X | X | O | X | X | X | X | 2 |
| Mayonnaise containing ornithine-aspartic acid | O | O | O | O | O | X | O | O | O | O | X | O | O | O | O | 13 |

NOTE:
X = Not agreeable.
O = Agreeable.

The present mayonnaise was superior to a mayonnaise without the addition of ornithine-aspartic acid salt or ornithine-aspartic acid peptide at the 5% level of significance.

Conclusion: Among the various foods, mayonnaise has a distinct taste. However, it often lacks body and harmonization of taste. Moreover, there is often observed separation of the salad oil. However, these defects can be overcome with the addition of ornithine-aspartic acid salt or ornithine-aspartic acid peptide.

EXAMPLE 5

In manufacturing sauce, 35 grams or ornithine-aspartic acid salt or 33 grams of ornithine-aspartic acid peptide are added to 10 liters of koji (malt) which was matured after the addition of acetic acid. A fortified product results.

EXAMPLE 6

In manufacturing soy sauce, to 10 liters of the material which was prepared by compressing brewed and ripened koji, followed by filtering, 36 grams of ornithine-aspartic acid salt or 34 grams of ornithine-aspartic peptide are added. The product has superior properties as compared to the usual soy sauce.

EXAMPLE 7

Soya bean or soya bean cake is treated with hydrochloric acid and the resulting amino acid solution is neutralized and filtered. To 10 liters of the resulting amino acid solution, 32 grams of ornithine-aspartic acid salt or 30 grams of ornithine-aspartic acid peptide are added, yielding a fortified product.

EXAMPLE 8

In manufacturing miso (fermented soy bean paste), at the period when the mash (moromi) is transferred for homogenizing or at the subsequent step of processing, 32 grams of ornithine-aspartic acid salt or 30 grams of organoleptic panel test consisting of 10 taste testers was given in order to compare the taste of the thus prepared product with that of miso without the addition of ornithine-aspartic acid salt or ornithine-aspartic acid peptide. The results are shown in the table below.

TABLE 3

| Miso | Tester— | | | | | | | | | | Total |
|---|---|---|---|---|---|---|---|---|---|---|---|
| | 1 | 2 | 3 | 4 | 5 | 6 | 7 | 8 | 9 | 10 | |
| Miso only | X | X | X | X | X | X | X | X | X | X | 0 |
| Miso containing ornithine-aspartic acid | O | O | O | O | O | O | O | O | O | O | 10 |

NOTE:
X = Not agreeable.
O = Agreeable.

The present miso was superior to a miso without addition of ornithine-aspartic acid salt or ornithine-aspartic acid peptide at the 1% level of significance.

Conclusion: It has been found that the addition of ornithine-aspartic acid salt or ornithine-aspartic acid peptide in manufacturing miso (at the time of prefermentation) can promote, to a great extent, the fermentation of miso.

It has been also found that the addition of ornithine-aspartic acid salt or ornithine-aspartic acid peptide at the period when mash (moromi) is transferred for homogenizing, can improve the quality of miso and that the thus prepared miso is far more palatable then miso prepared in the conventional manner.

EXAMPLE 9

To 10 kg. of dried miso, 56 grams of ornithine-aspartic acid salt or 52 grams of ornithine-aspartic acid peptide are added to give a fortified product.

EXAMPLE 10

In preparing milk, 30 grams of ornithine-aspartic acid salt or 28 grams of ornithine-aspartic acid peptide are added to 10 liters of filtered milk to yield a fortified product.

EXAMPLE 11

In manufacturing condensed milk, 30 grams of ornithine-aspartic acid salt or 28 grams of ornithine-aspartic acid peptide are added to 10 liters of the intermediate product after the filtration step.

EXAMPLE 12

In manufacturing powdered milk, 52 grams of ornithine-aspartic acid salt or 48 grams of ornithine-aspartic acid peptide are added to 10 kg. of the intermediate product at the step after the drying and powdering process.

EXAMPLE 13

In manufacturing cheese, 45 grams of ornithine-aspartic acid salt or 42 grams of ornithine-aspartic acid peptide were added to 10 kg. of the product at the end of the process, i.e., at the step when salt was added and shaping was performed. An organoleptic panel test consisting of 10 taste testers was given in order to compare the taste of the thus prepared cheese with that of cheese without the addition of ornithine-aspartic acid salt or ornithine-aspartic acid peptide. The results are shown in the table below.

TABLE 4

| Cheese | Tester— | | | | | | | | | | Total |
|---|---|---|---|---|---|---|---|---|---|---|---|
| | 1 | 2 | 3 | 4 | 5 | 6 | 7 | 8 | 9 | 10 | |
| Cheese only | X | X | X | O | X | X | X | X | X | X | 1 |
| Cheese containing ornithine-aspartic acid | O | O | O | X | O | O | O | O | O | O | 9 |

NOTE:
X = Not agreeable.
O = Agreeable.

The present cheese was superior to a cheese containing neither ornithine-aspartic acid salt nor ornithine-aspartic acid peptide at the 5% level of significance.

Conclusion: There was observed a considerable fermentation-promoting effect when ornithine-aspartic acid salt or ornithine-aspartic acid peptide was added to cheese in order to promote ripening of the cheese. There was also observed an improvement in flavor as shown in the results of the organoleptic panel test.

EXAMPLE 14

In the manufacture of ice cream at the step of mixing the raw materials, 40 grams of ornithine-aspartic acid salt or 37 grams of ornithine-aspartic acid peptide are added per 100 liters of the total product.

EXAMPLE 15

To 10 kg. of barley powder, soybean powder, rice powder or the like, 50 grams of ornithine-aspartic acid salt or 46 grams of ornithine-aspartic acid peptide are added for the purpose of enrichment.

EXAMPLE 16

In the manufacture of chewing gum, at the mixing step before shaping, 30 grams of ornithine-aspartic acid salt or 28 grams of ornithine-aspartic acid peptide are added per 10 kg. of the total weight, together with millet jelly or the like. A part of these additives can be used as a covering powder in the packing step.

EXAMPLE 17

In manufacturing a paste from the starch of devil's tongue, 30 grams of ornithine-aspartic acid or 28 grams of ornithine-aspartic acid peptide are added to 10 kg. of the starch powder of the devil's tougue and grinding it. Alternatively, 24 grams of ornithine-aspartic acid or 22 grams of its peptide are added to 10 liters of the intermediate product at the final step, i.e. at the step in which the starch powder of the devil's tongue is boiled and cooled.

EXAMPLE 18

In manufacturing bean curd, 31 grams of ornithine-aspartic acid salt or 29 grams of its peptide are added to 10 liters of the intermediate product after the step in which ground bean is boiled.

EXAMPLE 19

At the mixing step in manufacturing mixed fodder for domestic animals, 300 grams (0.3% by weight) of ornithine-aspartic acid salt are added to 100 kg. of the mixed fodder.

All of the fortified foods prepared according to Examples 1 through 19 exhibit superiority over the same food prepared without said additives.

EXAMPLE 20

10 grams of ornithine-aspartic acid salt or the peptide thereof, 10 grams of sodium glutamate, 80 grams of table salt and binder amount of starch are admixed by stirring. Products are produced by packing the above-mentioned mixture in moistureproof vessels.

EXAMPLE 21

10 grams of ornithine-aspartic acid salt or peptide, 5 grams of sodium glutamate, 40 grams of powdered table salt and a binder amount of starch, milk sugar, or crystalline cellulose are admixed. A small amount of water is added to the mixture which is then shaped into tablets. After drying the tablets are ready to be packed for shipment.

EXAMPLE 22

The same raw materials as in Examples 21 are admixed and after controlling the moisture content at from 10 to 15% by weight, the mixture is made into granules by use of a rotary granulating machine, followed by drying and packaging.

EXAMPLE 23

One of the preferred recipes for preparing 4510 liters of pure synthetic sake, the alcoholic content of which is 20% by weight, is shown in the following table.

TABLE 5

| | |
|---|---|
| Alcohol (95 percent by weight) liters | 950 |
| Lactic acid (75 percent) do | 1.48 |
| Glucose (70 percent by weight) kg | 271 |
| Millet jelly kg | 25.5 |
| Succinic acid kg | 5.2 |
| Sodium glutamate kg | 0.98 |
| Glycine kg | 0.495 |
| Alanine kg | 0.512 |
| Ornithine-aspartic acid salt kg | 1.56 |
| Sodium succinate kg | 0.98 |
| Table salt kg | 0.635 |
| Acid potassium phosphate kg | 0.312 |
| Acid calcium phosphate kg | 0.298 |
| Water liters | 3240 |
| Colorant | Suitable amount |

EXAMPLE 24

For the sake of comparison, the following three kinds of synthetic sake (control, A and B) were prepared. The water used was well water, purified by passing through an active carbon bed. The pH of the prepared sake was in each case 4.10. A is a recipe containing ornithine-aspartic acid salt and B is a recipe containing ornithine-aspartic acid peptide. The control is a receipe containing neither a salt nor a peptide of aspartic acid.

TABLE 6

| | Control, kg. | A, kg. | B, kg. |
|---|---|---|---|
| Glucose (70% by weight) | 10.800 | 10.800 | 10.800 |
| Millet jelly | 1.020 | 1.020 | 1.020 |
| Succinic acid | 0.204 | 0.204 | 0.204 |
| Sodium glutamate | 0.039 | 0.039 | 0.030 |
| Glycine | 0.020 | 0.020 | 0.020 |
| Alanine | 0.020 | 0.020 | 0.020 |
| Ornithine-aspartic acid salt or peptide | | [1] 0.062 | [2] 0.058 |
| Sodium succinite | 0.039 | 0.039 | 0.039 |
| Table salt | 0.025 | 0.025 | 0.025 |
| Acid potassium phosphate | 0.012 | 0.012 | 0.012 |
| Acid calcium phosphate | 0.012 | 0.012 | 0.012 |
| Alcohol (95% by weight), liters | 38,000 | 38,000 | 38,000 |
| Water | 116,280 | 116,280 | 116,280 |
| Lactic acid (75% by weight) | 0.060 | 0.060 | 0.060 |

[1] Salt.
[2] Peptide.

EXAMPLE 25

Ornithine-aspartic acid salt and ornithine-aspartic acid peptide were added separately, as is shown in the following table, to filtered sparking liquors, thus making liquor A and B. These were compared with a control.

TABLE 7

| | Control | A | B |
|---|---|---|---|
| Sparkling liquor, liters | 10 | 10 | 10 |
| Ornithine-aspartic acid salt, gram | | 40 | |
| Ornithine-aspartic acid peptide, gram | | | 37 |

The pH of each of the three kinds of finished sparkling liquor was 4.20.

EXAMPLE 26

40 g. of ornithine-aspartic salt or 37 g. of ornithine-aspartic acid peptide was added separately to 10 liters of ripened white or red grape wine.

EXAMPLE 27

45 g. of ornithine-aspartic acid salt or 42 g. of ornithine-aspartic acid salt peptide was added to 10 liters of port wine, simultaneously with sugar, alcohol and colorant.

EXAMPLE 28

45 g. of ornithine-aspartic acid salt or 42 g. of ornithineaspartic acid peptide was added to 10 liters of ripened apple wine.

EXAMPLE 29

34 g. of ornithine-aspartic acid salt or 31 g. of ornithine-aspartic acid salt peptide was added to 10 liters of ripened and filtered plum wine.

EXAMPLE 30

In manufacturing spicy wine (liqueur), 45–100 g. of ornithine-aspartic acid salt or 42–90 g. of ornithine-aspartic acid peptide was added to 10 liters of spicy wine after the alcohol, medicine sugars and colorants were dissolved.

EXAMPLE 31

41 g. of ornithine-aspartic acid salt or 38 g. of ornithine-aspartic acid peptide was added to 10 liters of ripened raochu.

EXAMPLE 32

100 g. of ornithine-aspartic acid salt or 90 g. of ornithine-aspartic acid peptide was added to 10 liters of shochu.

Wines prepared according to the recipes of Examples 26–32 and containing ornithine-aspartic acid salt or ornithine-aspartic acid peptide were provided to have better body over wine without these additives.

EXAMPLE 33

In a mixing step of preparing mixed fodder for domestic animals, 300 grams (0.3%) of ornithine-aspartic acid peptide were added to 100 kg. of fodder. The mixed fodder thus prepared was subjected to an experiment on feeding animals to obtain the result as shown in the following tables 8 and 9.

A feeding test was conducted by using 40 pigs (average body weight: Ca. 30 kg.), which were divided into two groups. One group was fed with the present fodder and the effect of the ornithine-aspartic acid peptide on fattening the pigs was evaluated by measuring the increase of weight when compared with the other group (control group) which was fed with fodder containing no ornithine-aspartic acid peptide.

The expression "salt of ornithine-aspartic acid" or related expressions in the present application has reference to ornithine-aspartate of the formula:

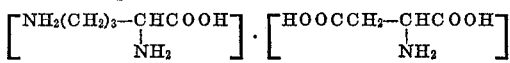

The expression "peptide of ornithine-aspartic acid" or related expressions in the present application has reference to the peptide of the formula:

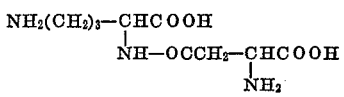

The invention being thus described, it will be obvious that the same may be varied in many ways. Such variations are not to be regarded as a departure from the spirit and scope of the invention, and all such modifications as would be apparent to one skilled in the art are intended to be included herein.

What is claimed is:

1. A flavor fortified food or alcoholic beverage containing about 0.1% to 1.0% by weight of a copolypeptide selected from the group consisting of ornithine-aspartic acid copolypeptide salt and ornithine aspartic acid copolypeptide.

2. A fortified alcoholic beverage according to claim 1, wherein said alcoholic beverage is sake.

3. A fortified alcoholic beverage according to claim 1, wherein said alcoholic beverage is beer.

4. A fortified alcoholic beverage according to claim 1, wherein said alcoholic beverage is sparkling liquor.

5. A fortified alcoholic beverage according to claim 1, wherein said alcoholic beverage is a fruit wine.

6. A fortified alcoholic beverage according to claim 1, wherein said alcoholic beverage is a liqueur.

7. A fortified dairy product containing about 0.1% to 5.0% by weight of a member selected from the group consisting of ornithine-aspartate copolypeptide and ornithine-aspartic acid copolypeptide.

TABLE 8

[(I) Feeding test (kg.)]

| Compartment | 2 weeks | 4 weeks | 6 weeks | 8 weeks | 10 weeks | 12 weeks | 14 weeks | 16 weeks | Former | Latter | Total |
|---|---|---|---|---|---|---|---|---|---|---|---|
| A group (control): | | | | | | | | | | | |
| Former | 17.7 | 21.7 | 24.6 | 21.0 | | | | | 85.0 | | 234.7 |
| Latter | | | | 7.0 | 31.7 | 36.6 | 40.0 | 34.4 | | 149.7 | |
| Total | 17.7 | 21.7 | 24.6 | 28.0 | 31.7 | 36.6 | 40.0 | 34.4 | 85.0 | 149.7 | 234.7 |
| B group (added): | | | | | | | | | | | |
| Former | 17.7 | 21.7 | 24.6 | 21.0 | | | | | 85.0 | | 234.7 |
| Latter | | | | 7.0 | 31.7 | 36.6 | 40.0 | 34.4 | | 149.7 | |
| Total | 17.7 | 21.7 | 24.6 | 28.0 | 31.7 | 36.6 | 40.0 | 34.4 | 85.0 | 149.7 | 234.7 |

NOTE.—Former means a mixed fodder which is used for feeding pigs of the infant stage. Latter means a mixed fodder which is used for feeding pigs of the growing stage. The A-group was fed with fodder without the addition of ornithine-aspartic acid salt. The B-group was fed with the present fodder (containing the ornithine-aspartic acid salt.)

TABLE 9

[(II) Results of weight measurement test (kg.)]

| Compartment | Beginning | After 2 weeks | After 4 weeks | After 6 weeks | After 8 weeks | After 10 weeks | After 12 weeks | After 14 weeks | After 16 weeks |
|---|---|---|---|---|---|---|---|---|---|
| A group (control); average weight | 20.9 | 28.2 | 36.3 | 45.6 | 50.3 | 60.95 | 72.2 | 82.15 | 87.0 |
| B group (added); average weight | 21.2 | 29.5 | 37.3 | 47.4 | 54.2 | 73.0 | 75.1 | 85.25 | 91.95 |

NOTE.—A is as described above; B is as described below.

*Result*: As is clear from the Tables 8 and 9, there was observed a remarkable increase in the average weight of the group fed with the present fodder while there was not observed any difference in the amount of consumed fodder.

8. A fortified cereal containing about 0.1% to 5.0% by weight of a member selected from the group consisting of ornithine-aspartate copolypeptide and ornithine-aspartic acid copolypeptide.

9. A fortified confection containing about 0.1% to 5.0% by weight of a member selected from the group consisting of ornithine-aspartate copolypeptide and ornithine-aspartic acid copolypeptide.

10. A fortified animal fodder containing about 0.1% to 5.0% by weight of a member selected from the group consisting of ornithine-aspartate copolypeptide and ornithine-aspartic acid copolypeptide.

11. Rice fortified with a composition comprising about 0.1% to 1.5% by weight table salt and about 0.01% to 0.5% by weight of a member selected from the group consisting of ornithine-aspartate copolypeptide and ornithine-aspartic acid copolypeptide, based on the weight of the rice, respectively.

12. Rice fortified with a composition according to claim 11, said composition further including a minor proportion of sodium glutamate.

13. A process for fortifying food to enhance the flavor thereof which comprises adding to said food about 0.1% to 1.0% by weight of a member selected from the group consisting of ornithine-aspartate copolypeptide and ornithine-aspartic acid copolypeptide.

14. A process according to claim 13, wherein said food is selected from the group consisting of food seasonings, dairy products, cereals, confections, animal fodder and rice.

15. A process for fortifying an alcoholic beverage to enhance the flavor thereof which comprises adding to said beverage about 0.1% to 1.0% by weight of a member selected from the group consisting of ornithine-aspartate copolypeptide and ornithine-aspartic acid copolypeptide.

16. A process according to claim 15, wherein said alcoholic beverage is selected from the group consisting of sake, beer, sparkling liquors, fruit wines, and liqueurs.

References Cited

UNITED STATES PATENTS 2,731,348   1/1956   Striegel _____ 99—8

OTHER REFERENCES

Abe et al.: Chemical Abstracts vol. 60, p. 4250d.

RAYMOND N. JONES, Primary Examiner

R. B. ANDEWELT, Assistant Examiner

U.S. Cl. X.R.

99—2 R, 14, 29, 30, 31, 35, 54, 64, 80, 83, 115, 136, 144; 260—112.5; 424—177, 319